(12) United States Patent
Beal et al.

(10) Patent No.: US 8,925,382 B1
(45) Date of Patent: Jan. 6, 2015

(54) SYSTEM AND PROCESS FOR MEASURING A VOLUME OF A LIQUID WITHIN A KEG

(76) Inventors: Kevin Beal, Houston, TX (US); Louis W. Apostolakis, Austin, TX (US)

(*) Notice: Subject to any disclaimer, the term of this patent is extended or adjusted under 35 U.S.C. 154(b) by 219 days.

(21) Appl. No.: 13/416,343

(22) Filed: Mar. 9, 2012

(51) Int. Cl.
*G01F 23/14* (2006.01)

(52) U.S. Cl.
USPC .......................................................... 73/299

(58) Field of Classification Search
None
See application file for complete search history.

(56) References Cited

U.S. PATENT DOCUMENTS

| 698,334 | A | 4/1902 | Smith |
| 2,127,875 | A | 8/1938 | Lippert et al. |
| 3,696,675 | A | 10/1972 | Gilmour |
| 3,956,934 | A | 5/1976 | White |
| 4,220,048 | A | 9/1980 | Grepiotis et al. |
| 6,260,414 | B1 | 7/2001 | Brown et al. |
| 6,925,872 | B2 | 8/2005 | Hadala |
| 7,302,846 | B2 | 12/2007 | Hadala |
| 7,810,679 | B2 | 10/2010 | Wauters et al. |
| 2003/0172745 | A1* | 9/2003 | Mitchinson ................ 73/861.49 |
| 2008/0189078 | A1* | 8/2008 | Vok et al. ...................... 702/188 |
| 2010/0089943 | A1* | 4/2010 | Till ...................................... 222/1 |
| 2010/0308084 | A1* | 12/2010 | Riis ............................ 222/400.7 |
| 2013/0008527 | A1* | 1/2013 | Gitlin et al. ..................... 137/317 |

FOREIGN PATENT DOCUMENTS

GB 2192989 * 1/1988

* cited by examiner

*Primary Examiner* — Robert R Raevis
(74) *Attorney, Agent, or Firm* — Egbert Law Offices, PLLC

(57) ABSTRACT

A system for measuring a volume of a liquid has a keg with a nozzle and a dip tube extending into the keg, a coupler having a gas flow path and a liquid flow path, a transducer cooperative with the gas flow path so as to measure a pressure of gas in the keg and cooperative with the liquid flow path so as to measure a pressure of the liquid at a location above the nozzle of the keg, and a controller connected to the transducer so as to measure a difference between the measured pressure of the gas and the measured pressure of the liquid. The controller converts the measured difference into a value corresponding to a volume of the liquid in the keg. The system can also be used to monitor the temperature of the liquid within the keg.

10 Claims, 6 Drawing Sheets

SYSTEM AND PROCESS FOR MEASURING A VOLUME OF A LIQUID WITHIN A KEG

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for measuring the volume of liquid in a container. More particularly, the present invention relates to devices that are particularly configured for the measurement of a volume of beer within a keg. Additionally, the present invention relates to techniques for measuring liquid volume based on pressure differentials and/or combined with a flow meter.

2. Description of Related Art Including Information Disclosed Under 37 CFR 1.97 and 37 CFR 1.98.

In the bar and restaurant industry, an accurate inventory is paramount to maintaining the bottom line and anticipated profit margins. When food and drink inventory are lost, it eats into the company's profit. Accordingly, restaurant owners and operators employ strict inventory tracking methods for food, liquor and controllables. For instance, food consumption is measured by noting counts per unit or weighing the food product. Specific emphasis is placed on the amount of pounds and ounces being sold and lost. Inventory for controllables, such as paper goods, condiments, glassware and miscellaneous items are also routinely counted. Liquor is accounted for by counting bottles and noting levels remaining in partially used bottles. Most bar inventory methods count the bottles in tenths or quarters. This measuring technique is reasonably accurate since the liquor levels can be seen through the bottles. While accountable inventory measuring techniques exist for food, liquor and controllables, there is still no accurate, cost effective method or device for taking the inventory of draft beer in a closed keg.

Conventional techniques for taking inventory of draft beer are either inaccurate, unsafe, time-consuming and/or too expensive. Draft beer is sold in opaque kegs. Therefore, beer levels cannot be readily and accurately ascertained. Inventory for draft beer is primarily done by lifting and shaking the keg. Lifting and shaking kegs to determine the quantity remaining is highly subjective and inaccurate. It only provides an approximation of how much beer is left in the keg. Another method involves lifting and weighing the keg to determine the amount of beer remaining Weighing the keg, while theoretically more accurate, requires a durable scale and additional information for converting weight to ounces. Additionally, errors can be made in weighing the keg when objects are placed upon the keg during the measurement. Neither method is convenient and both involve heavy lifting. Since a full keg weighs approximately 160 pounds, there is a high risk of back injuries, muscle tears and hernias, associated with lifting, shaking and/or weighing kegs, even with a partially filled keg. An injured employee is inevitably lost for a period of time and a worker's compensation claim is invariably made, increasing the likelihood of increased insurance premiums.

Often, the most common method for measuring the beer in a keg that does not involve the lifting of the keg is simply to shake or kick the keg. This approach is extremely inaccurate. Alternatively, a flow meter can be used to measure the flow of beer through the beer line. This will measure the amount of beer consumed, from which the remainder of the keg can be inferred. Unfortunately, these flow meters must be manually reset when the keg is replaced. This introduces user error and is not cost effective.

Industry-wide, it has been found that beer distributors do not know the inventory of the customer and, thus, their product fulfillment needs. Systems that employ long beer lines have substantial foaming issues when the keg is allowed to go empty and the beer line fills with air. Foam wastes product and diverts employee time from serving customers. Most draft beer systems are prone to employee theft. Refrigeration space is expensive. As such, it is desirable to avoid unnecessary inventory. Under those circumstances where the keg runs empty, sales of such a particular beer product will not occur. The carbon dioxide is lost when the employee pulls a tap and there is no beer remaining in the lines. As such, this carbon dioxide is wasted.

As such, it is desirable to have a system that measures the liquid levels within a keg that does not involve kicking, lifting, shaking or weighing. Additionally, it is desirable to have a system for measuring the liquid levels in kegs that can be remotely accessed.

In the past, various patents have issued relating to devices for measuring liquid levels in a container. U.S. Pat. No. 698,334, issued on Apr. 22, 1902 to J. D. Smith, is an early patent for a spring scale that is used to measure the weight of a keg. A vertically-movable platform supports the keg. The level of the keg will rise as the liquid within the keg is depleted. The rising of the platform will provide an indication of the level of liquid within the keg. Additionally, a gauge is provided which provides an assessment of the number of gallons remaining in the keg.

U.S. Pat. No. 2,127,875, issued on Aug. 23, 1938 to Lippert et al., teaches a dispensing gauge. A metallic draft pipe is immersed within the liquid within the keg. The metallic draft pipe has a longitudinal groove extending from end to the other. A longitudinal electrode is mounted in the groove and insulated from the draft pipe. The electrode and the draft pipe are exposed to the liquid.

U.S. Pat. No. 3,696,675, issued on Oct. 10, 1972 to A. S. Gilmour, describes an apparatus and method for externally determining the level of a mass of flowable material, such as liquid or granular material, contained in a closed or sealed container. This is an apparatus of elongated strip of material coated or embedded with cholesteric liquid crystals which vary chromatically with variations in temperature. The elongated strip is applied to the outer surface of the wall of the container in heat-conducting relationship thereto and extends along the height of the container. Because of the difference in the rate of heat conduction of the void volume and the filled space of the container, the container wall will experience a temperature radiant which is pronounced at the interface of the contents. The change in temperature is readily discernable visually because of the abrupt change in color of the elongated strip at the material interface. As such, it permits an observer to readily detect the level of the contents in the container.

U.S. Pat. No. 3,956,934, issued on May 18, 1976 to J. M. White, shows a liquid level indicator for a pressurized liquid container, such as a keg. The keg has an outlet arranged to be connected to a dispensing conduit for conducting the liquid from the container to the point of use at a remote location. This outlet includes a gauge tube of transparent material having a check valve therein. The level of liquid in the gauge tube continuously corresponds to the level of liquid in the container. The check valve and the gauge tube maintain liquid in the gauge tube during the dispensing of the liquid from the container through the dispensing conduit.

U.S. Pat. No. 4,220,048, issued on Sep. 2, 1980 to Greciotis et al., teaches a cooler and level indicator for beer kegs. In particular, there is an insulated container for holding iced water in contact with a keg of beer. An insulated cover seals the container. An externally readable level gauge provides an indication of the iced water level. This level is proportional to the amount of beer remaining in the keg after the keg becomes buoyant.

U.S. Pat. No. 6,260,414 issued on Jul. 17, 2001 to Brown et al., describes liquid crystal liquid level indicator for use with a keg. The crystal fluid level indicator is placed in thermal contact with the exterior surface of the keg. This indicator produces a color change that is a function of the liquid temperature when the liquid is within a predetermined temperature range. The indicator is a multiple level strip having a top transparent layer, a liquid crystal layer, a black background layer, and an attachment layer employing a protected adhesive on its bottom surface for removably attaching the strip to the keg.

U.S. Pat. No. 6,925,872, issued on Aug. 9, 2005 to A. J. Hadala, provides a temperature-sensing device for determining the level of a fluid in a container. This device is based upon the fact that a beverage container containing a liquid will absorb heat energy from the surrounding environment at a greater rate than a gaseous component in the headspace of the beverage container. As the liquid is drawn from a beverage container, a greater headspace results. The measuring device is employed along the height of the keg such that the volume may be determined by observing the difference in the temperature along the height of the container. U.S. Pat. No. 7,302,846, issued on Dec. 4, 2007 also to A. J. Hadala, shows a similar structure.

U.S. Pat. No. 7,810,679, issued on Oct. 12, 2010 to Wauters et al., teaches a home beer dispensing apparatus that has a keg with a self-contained bag filled with a beer and a pressure system. The pressure system creates a pressurized air space between the keg inner walls and the bag to assist in the dispensing of the beer. The apparatus also has a pressure sensing system adapted to measure the time rate of pressure change in the keg. A signaling device is responsive to the time rate of pressure change in the keg to produce a signal related to the volume of beer remaining the keg. The signal is displayed visually on the dispensing apparatus.

It is an object of the present invention to provide a system for the measuring of a volume of liquid in a keg that effectively measures the volume of liquid remaining in the keg.

It is another object of the present invention to provide a system for the measuring the volume of liquid in a keg that does not require modification in the structure of the keg itself.

It is still another object of the present invention to provide a system for measuring the volume of liquid in a keg that relies on pressure differentials between the liquid pressure and the gas pressure to determine the volume of liquid in the keg.

It is another object of the present invention to provide a system for the measuring of a volume of liquid in a keg that allows for the remote accessing of the volume information.

It is further object of the present invention to provide a system for the measuring of a volume of liquid in a keg which easy to use, easy to install, and relatively inexpensive.

These and other objects and advantages of the present invention will become apparent from a reading of the attached specification and appended claims.

BRIEF SUMMARY OF THE INVENTION

The present invention is a system for measuring a volume of a liquid that comprises a keg having a nozzle and a dip tube extending from the nozzle into the keg, a coupler affixed to the nozzle and having a gas flow path and a liquid flow path therein, a transducer cooperative with the gas flow path so as to measure a pressure of gas in the keg and cooperative with the liquid flow path so as to measure a pressure of the liquid at a location above the nozzle of the keg, and a controller connected to the transducer so as to measure a difference between the measured pressure of the gas and the measured pressure of the liquid. The keg has the volume of liquid therein. The gas flow path opens through the nozzle of the keg. The liquid flow path connects to the dip tube. The controller converts the measured difference into a value corresponding to a volume of the liquid in the keg.

In the system of the present invention, the liquid flow path is unobstructed along the dip tube to a location above the transducer. The coupler has a ball check valve positioned in the liquid flow path adjacent a top of the coupler and above the transducer. The coupler has a solenoid valve connected thereto. The controller is connected to the solenoid valve so as to actuate the solenoid valve when the measured difference indicates that the keg is empty of the liquid. The solenoid valve serves to close the liquid flow path.

A transmitter is connected to the controller so as to transmit the value corresponding to the volume of liquid in the keg to a remote location. A server is located at the remote location. The controller serves to post the value to the server. The controller periodically measures the difference between the measured pressure of the gas and the measured pressure of the liquid and temporarily stores the periodic measurements. The controller periodically communicates the values to the server.

The coupler has an indicator thereon. The controller is connected to the indicator. The indicator serves to indicate when the volume of the liquid of the keg is low. The coupler has a first port communicating with the gas flow path and a second port communicating with the liquid flow path. The transducer is affixed in sealed relation to the first port and to the second port.

The present invention is also a coupler for affixing to a nozzle of a keg. The coupler has a body with a gas flow path and a liquid flow path therein. The body has a connector thereon suitable for coupling to the nozzle of the keg. A gas inlet port is formed on the body. The gas inlet port communicates with the gas flow path so as to allow the gas to be passed into the keg. A liquid outlet port is formed on the body. The liquid outlet port communicates with the liquid flow path. A transducer is affixed to the body and cooperative with the gas flow path so as to measure a pressure of gas therein and cooperative with the liquid flow path so as to measure a pressure of the liquid therein.

In the coupler of the present invention there is a ball check valve affixed within the body in the liquid flow path adjacent to the liquid outlet port in a location above the transducer. A handle extends outwardly of the body. This handle is movable between a position in which the connector of the body is uncoupled from the nozzle of the keg and in a position in which the connector of the body is locked to the nozzle of the keg. The coupler has a solenoid valve therein or connected thereto. The solenoid valve is openable and closable relative to a volume of liquid in the keg. The container has a first port communicating with the gas flow path and a second port communicating with the liquid flow path. The transducer is affixed in sealed relation to the first port and to the second port.

A controller is connected to the transducer so as to measure a difference between the measured pressure of the gas and the measured pressure of the liquid. The controller serves to convert the measured difference into a value corresponding to a volume of the liquid in the keg.

The present invention is also a process of communicating a volume of a liquid in a keg. This process includes the steps of: (1) creating a value indicative of the volume of liquid in the keg; (2) transmitting a value from a location adjacent to the keg to a remote location; (3) posting the value at the remote location; and (4) accessing the posted value so as to remotely ascertain the volume of liquid in the keg.

In this process of the present invention, the step of creating a value comprises the steps of: (1) measuring a pressure of a gas in the keg; (2) measuring a pressuring of the liquid at a location above the keg; (3) determining a difference between the measured pressure of the gas and the measured pressure of the liquid; and (4) converting the measured difference into the value indicative of the volume of liquid in the keg. The step of transmitting includes transmitting the value by WiFi to a local access point, and communicating from the local access point to the remote server location. The remote location can be an off-site server. The step of transmitting can also communicate the readings of the values of the volume of liquid in the keg over a period of time, identifying a time of each of the readings, and providing an identification number associated with the keg from which the readings are taken.

In the present invention, the keg includes a plurality of kegs. The value are created from each of the plurality of kegs. The values are transmitted to the remote locations.

DETAILED DESCRIPTION OF THE INVENTION

Figure 1:
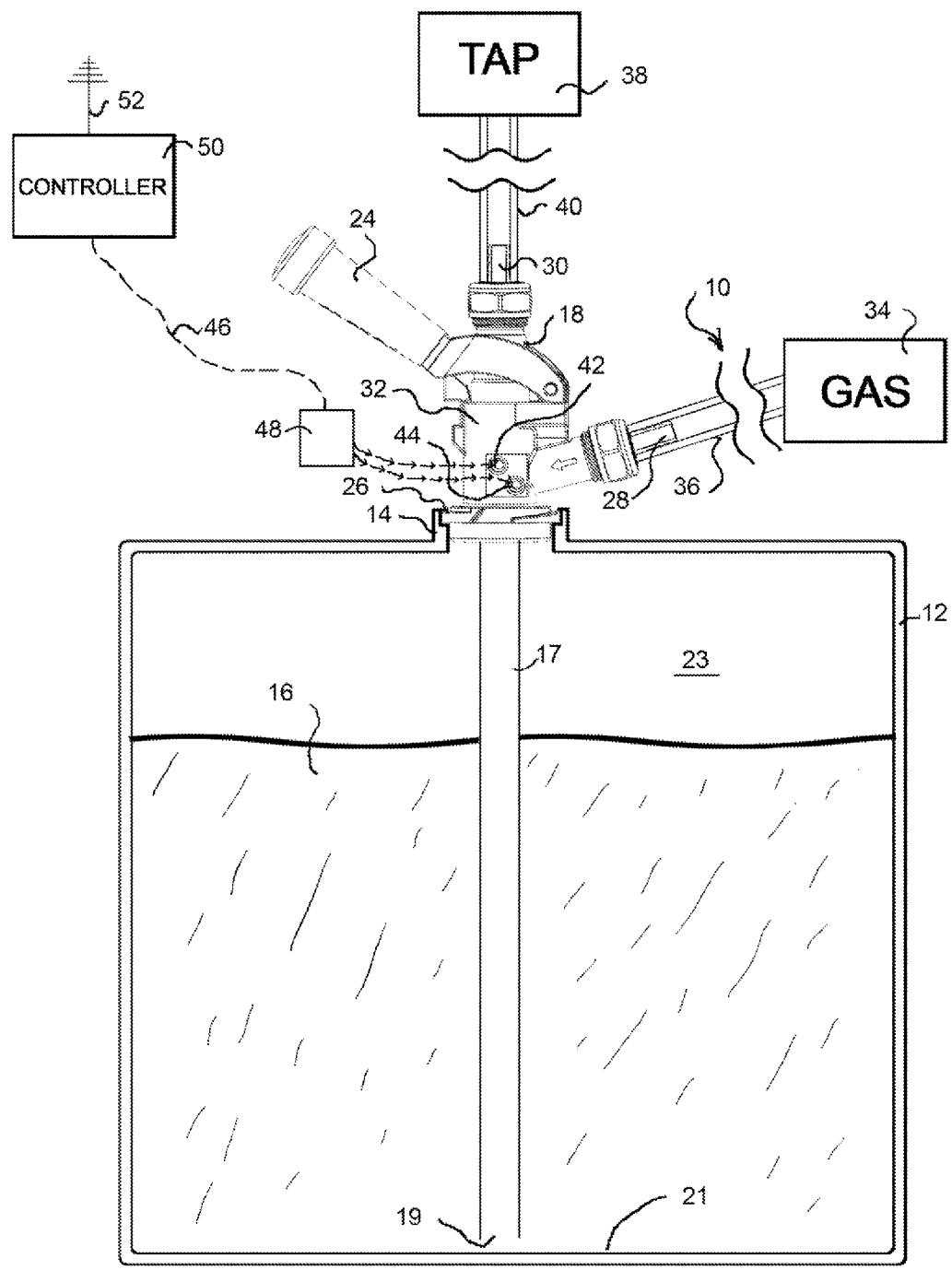
FIG. 1 is a diagrammatic illustration of the system for the measuring of volume of liquid in accordance with the preferred embodiment of the present invention.

Referring to FIG. 1 there is shown the system 10 for the measuring of a volume of liquid. This system 10 includes a keg 12 having a nozzle 14 at an upper end thereof. The keg 12 has a volume of liquid 16 on the interior thereof. The preferred embodiment of the present invention, the volume of liquid 16 is a volume of beer. However, various other liquids could be measured in accordance with the system of the present invention. A dip tube 17 extends from the nozzle 14 downwardly through the volume of liquid 16 so as to have an inlet 19 located adjacent to the bottom 21 of the keg 12. As such, the flow of liquid through the dip tube 17 is caused by the pressure in the head space 23 within the keg 12.

A coupler 18 is affixed to the nozzle 14. The coupler 18 has a gas flow path and a liquid flow path. The gas flow path will open through the nozzle 14 and into the keg so as to maintain pressure within the head space 23. The liquid flow path connects with the dip tube 17 so that the flow of liquid can pass upwardly into the coupler 18.

In particular, in FIG. 1, it can be seen that the coupler 18 includes a handle 24 pivotally mounted thereto. The handle can be moved between an upward position for the uncoupling of the connector 26 with the nozzle 14 and a downward position for locking the connector 26 to the nozzle 14. The coupler 18 has a gas inlet port 28 communicating with the gas flow path so as to allow gas to be introduced into the head space 23 of the keg 12. The coupler 18 also has a liquid outlet port 30 formed at an upper end thereof. The liquid outlet port 30 communicates with the liquid flow path within the interior of the body 32 of the coupler 18 so as to allow the liquid 16 to be passed outwardly of the coupler 18.

In FIG. 1, it can be seen that there is a supply of compressed gas 34 that is connected by a line 36 to the gas inlet port 28. A tap 38 is illustrated as connected by a hose 40 to the liquid outlet port 30 of the coupler 18.

The coupler 18 also includes a first transducer port 42 and a second transducer port 44. The second transducer port 44 is cooperative with the gas flow path so as to measure a pressure of gas within the head space 23 of the keg 12. The first transducer port 42 is cooperative with the liquid flow path so as to measure the pressure of the liquid at a location above the nozzle 14 of the keg 12. A transducer 48 (shown detached in FIG. 1, and more clearly in FIG. 6) is connected to both the first transducer port 42 and the second transducer port 44. The transducer 48 is connected by line 46 to a controller 50.

The controller 50 is illustrated as having antenna 52 connected thereto so that calculated information and values from the controller 50 can be passed outwardly of the controller. The antenna 52 can be replaced with other means for communicating such digital information, such as cables and other forms of wireless communication.

In the present invention, the volume of the liquid 16 within the keg 12 is measured by measuring the pressure difference between the liquid 16 and the gas 23. Since the liquid 16 is driven out of the keg 12 by using pressurized gas 34, the pressure of the input gas can be compared to the pressure of the fluid at a point above the keg 12. The difference of the two pressures is mathematically converted to a height equal to the distance between the measuring device and the residual fluid level in the keg 12 through the equation where pressure difference=density×gravity×height. Since the pressure is measured at a known distance above the keg 12, and since the keg 12 is of a consistent height, subtracting the pressure of the fluid column from the pressure of the fluid level of the keg 12 will give the height of the liquid 16 in the keg 12. Since kegs are of consistent diameter, knowing the height of the liquid 16 can be mathematically converted to the volume of the liquid 16 in the keg 12.

The coupler 18 is an apparatus which is physically locked onto the nozzle 14 of the keg 12. As such, the coupler 18 allows gas to enter the keg 12 and the liquid 16 to exit the keg 12 in a controlled fashion. In the present invention, the gas and fluid must have an unobstructed path to the surface of the beer in the keg 12. The coupler 18 is unique since traditional couplers have an integrated check valve that causes incorrect measurement. The pressure difference between a full keg and an empty keg is approximately 0.85 p.s.i. With such a small pressure gradient, accuracy is imperative.

The transducer ports 42 and 44 are small holes formed on the body 32 of the coupler 18. The holes are used by the transducer 48 to measure the pressure of the beer and the gas (such as carbon dioxide, nitrogen and or a mixture of both). The difference of these pressures allows the fluid height to be determined. The coupler 18 is designed so that the pressure of liquid is measured from within the inner core of the body 18. This is accomplished by a specially designed "O" ring which allows the tap to open a portal into the inner core where the liquid pressure is measured through the gas environment.

Figure 2:
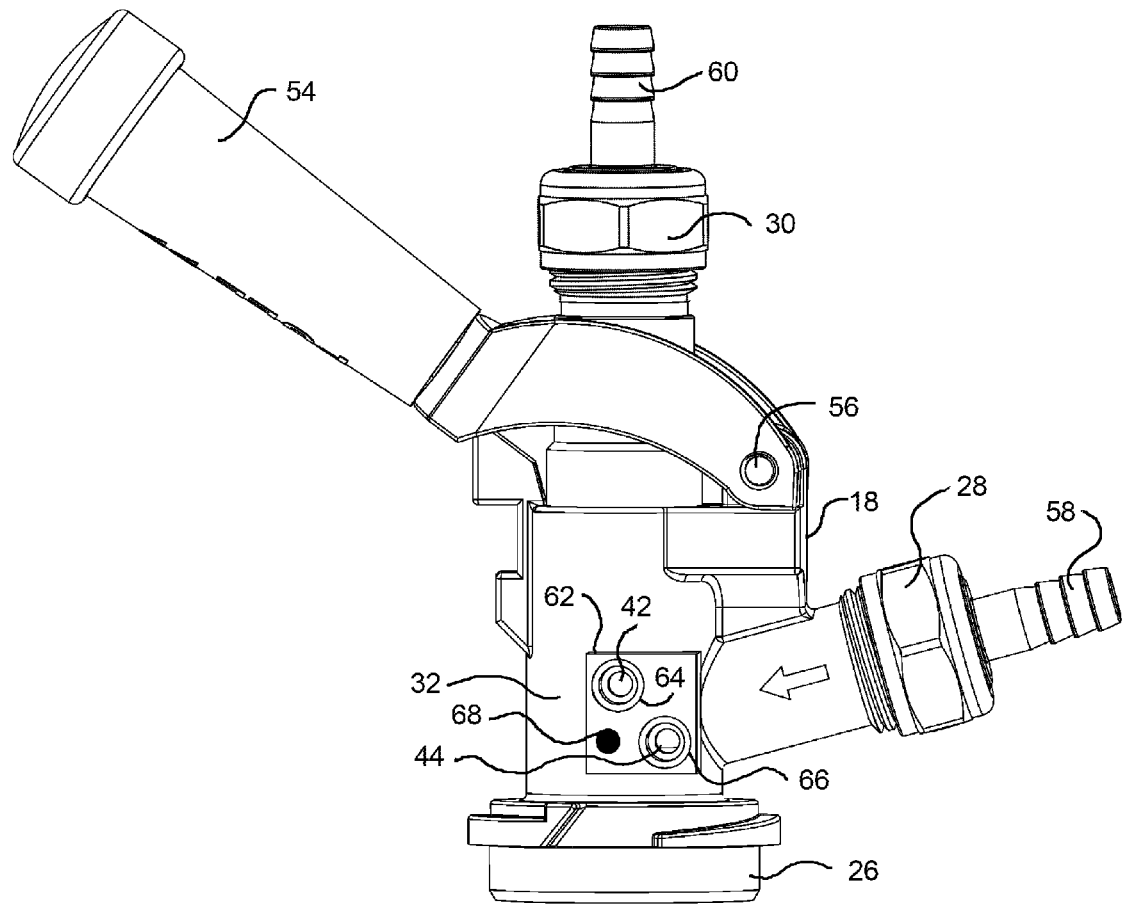
FIG. 2 is a side elevational view of the coupler as used in the system of the present invention.

FIG. 2 illustrates the configuration of the coupler 18 as used in the system of the present invention. The coupler 18 includes a body 32 having a connector 26, or locking ring, located at a bottom thereof and a liquid outlet port 30 formed at an upper end thereof. The connector 26 has a rubber seal thereon and is suitable for engaging with the nozzle 14 of the keg. A handle 54 is pivotally mounted at 56 to the body 32 so as to be movable angularly upwardly and downwardly. In the upper position, the core of the coupler 18 will be disengaged from the contents of the keg. In the lower position, after rotating the connector 26 to engage the keg, the handle will cause the core of the connector 18 to engage with the contents of the keg so as to lock the core 18 of the connector 26 in place and allow the fluid connections between the gas flow path and the liquid flow path to communicate with the keg.

FIG. 2 shows that there is a gas inlet port 28 that extends outwardly of the body 32. There is a male connector 58 that is formed at the end of the gas inlet port 28. As such, the male connector 58 can engage with a suitable hose connected to a supply of compressed gas. The liquid outlet port also includes a male connector 60 at an upper end thereof. The male connector 60 is also engagable with a hose extending to a tap so that the liquid from the keg can be discharged in an appropriate manner.

The transducer 48 is affixed to the first transducer port 42 and the second transducer port 44 on the body 32 so as to extend inwardly through the wall of the body to the respective gas flow path and the liquid flow path. A bracket 62 serves to secure the transducer 48 in place on the body 32. An O-ring seal 64 extends around the transducer port 42 so as to establish a liquid-tight seal with the port that is formed in the body 32. Similarly, another O-ring seal 66 extends around the transducer port 44 so as to establish a liquid-tight seal with the port into which the transduce 44 is extended. The transducer 48 can be suitably connected a wire to the controller.

An LED 68 is positioned in a housing (not shown) attached to the body 32. LED 68 can be suitably connected to the controller so as to provide a visual indication when the keg is low. The LED 68 can be positioned with the transducer 48 and a connector jack, possibly of the rj45 type, in an enclosure attached to the body 32.

The transducer 48 will include an enclosure to protect the components. A jack or an rj45 type of female receptacle can be utilized to attach a communication line from the controller to the transducers, as well as the LED 68. A small circuit board can be utilized so as to mount the components. A small micro-processor could be used so as to process data prior to passing to the controller.

Figure 3:
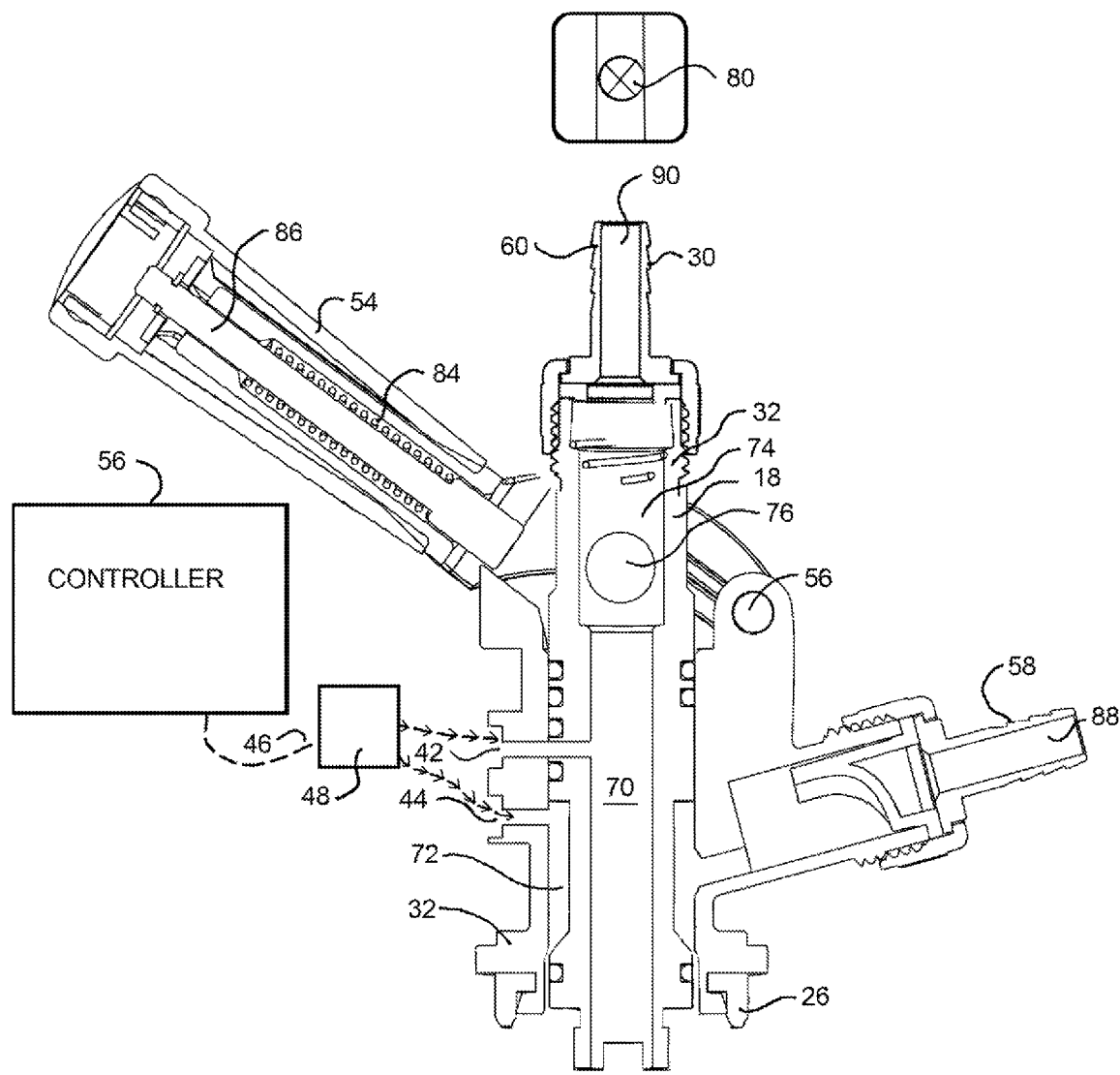
FIG. 3 is a cross-sectional view of the coupler as used in the system of the present invention.

FIG. 3 is a cross-sectional view of the coupler 18. In particular, the interior of the body 32 of the coupler 18 has the liquid flow path 70 therein and the gas flow path 72 therein. The gas flow path 72 extends longitudinally through the body 32 so as to have a lower end adjacent to the connector 26. A check valve 74 is mounted at the upper end of the liquid flow path 70. The check valve 74 is, in the present invention, positioned above the transducer 42. The check valve 74 serves to prevent a back flow of the liquid or a spillage of the keg when the keg is changed or when the coupler 18 is relocated so as to be above the beer portal. This allows the stabilization of pressures in larger systems since the pressure and flow of beer in long lines can interfere with the pressures. The check valve 74 includes a ball 76 that is located therein. When the liquid flows through the liquid flow path 70 upwardly through the check valve 74, the ball 76 will not block this flow. However, when the flow of the liquid passes back downwardly through the beer outlet port 30, the ball 76 will drop so as to be seated at the bottom of the check valve 74 and block the flow of liquid back downwardly through the liquid flow path 70.

A solenoid 80 can be positioned in the liquid flow path 70. Within the concept of the present invention, when it is sensed that the keg is empty, the solenoid 80 can be actuated so as to close the liquid flow path 70 and so as to block the release of gas therethrough. A solenoid valve 80 will normally be in an open position so as to that it does not restrict the flow of the liquid through the liquid flow path 70.

The transducer port 42 is cooperative with the liquid in the liquid flow path 70 so as to sense the pressure of the liquid in this area above the nozzle of the keg. Similarly, the transducer port 44 is cooperative with the gas flow path so as to sense the pressure of gas within the keg. The transducer 48 connected to the transducer ports 42 and 44 is connected by line 46 to the controller 56. The transducer 48 sends one differential pressure reading, sent as a number.

Figure 6:
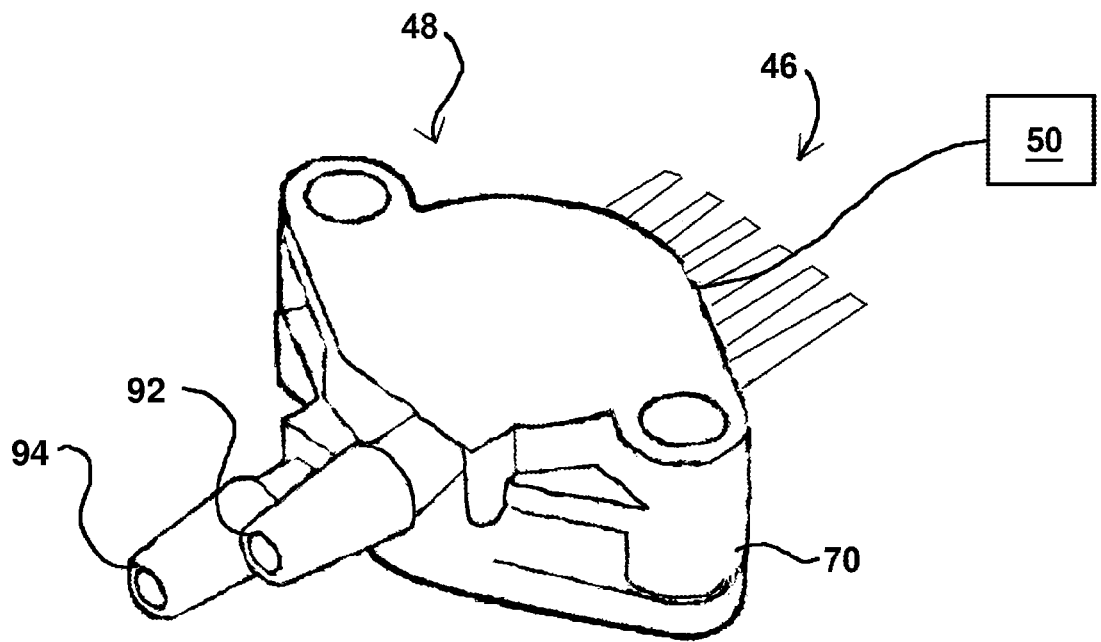
FIG. 6 is a perspective view of the transducer of the present invention.

Referring to FIG. 6 there is shown an isolated view of the transducer 48. The transducer 48 has an enclosure 70. A first stem 92 extends outwardly of the transducer 48 and is received by the first transducer port 42. A second stem 94 extends outwardly of the transducer 48 and is received by the second transducer port 44. The stems 92 and 94 allow for measurement of the liquid and gas pressure values. The transducer 48 is shown connected by wire 46 to the controller 50.

Figure 5:
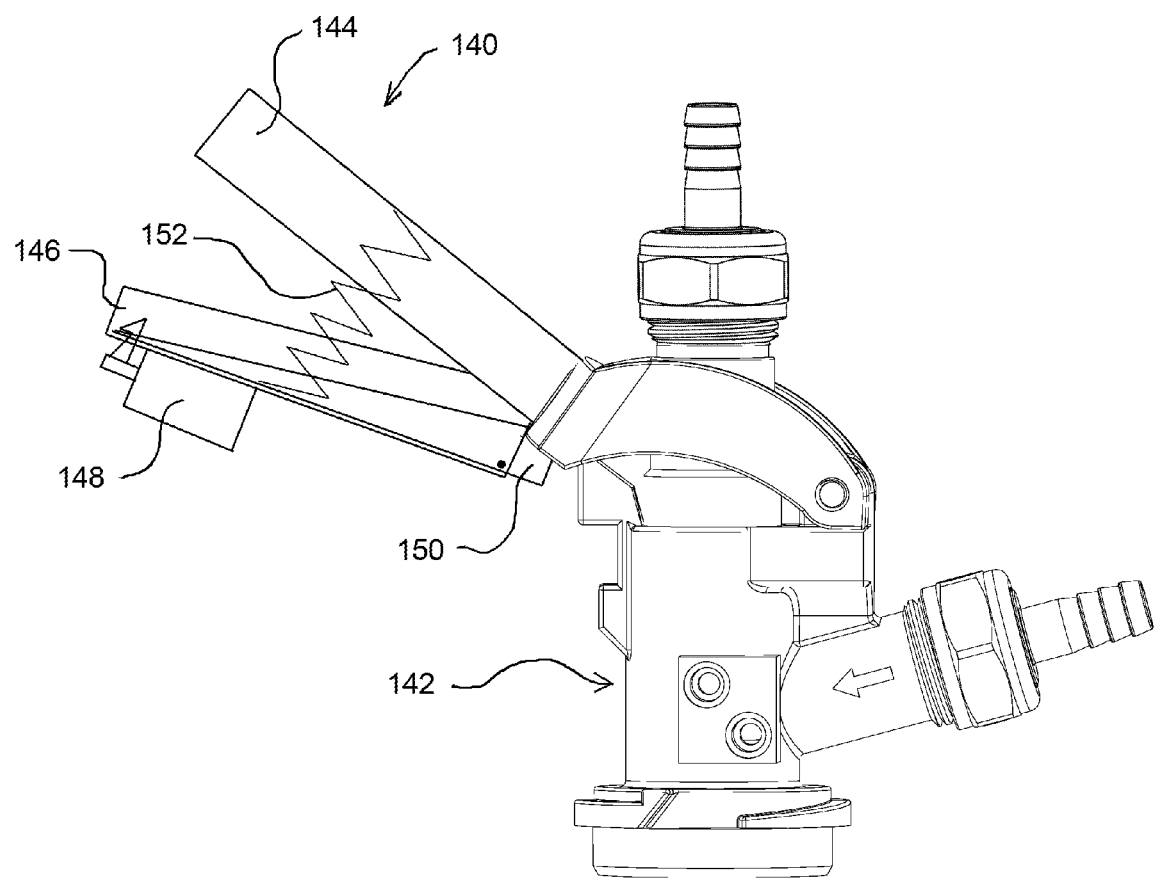
FIG. 5 is a schematic view of one embodiment of the solenoid mechanism of the present invention.

In FIG. 3, the handle 54 is pivotally mounted to the body 32 of the coupler 18. Handle 54 includes a spring to keep the release bar in place. Alternatively, the handle as shown in FIG. 5 may be used. This spring 84 extends around the release bar 86 within the interior of the handle 54. The handle 54 will operate in the manner of standard couplers that are used for kegs. The gas inlet port 88 has the male connector 58 bolted to a threaded portion at the end of the inlet port 26. There is a gas flow line 88 extending through the male connector 58, through the gas inlet port 26 and into the gas flow path 72 within the interior of the body 32. Similarly, the male connector 60 at the liquid outlet port 30 is threadedly secured to the body 32 of the coupler 18. As such, liquid can flow through the liquid flow path 70 and outwardly through the passageway 90 extending through the male connector 30.

The controller 56 is a device that samples and accepts the raw data, in the form of a voltage reading, from the pressure sensing transducer 48 on the coupler 18. The controller 56 processes those values, temporarily stores the values, and periodically communicates the values to a permanent storage location. The controller 56 can be located in the same refrigerated unit as the keg. The refrigerated unit is typically constructed with all sides being of metal. The controller 56 is responsible for stopping the flow of beer by activating the solenoid 80 when the keg is empty. The pressure transducer 48 is a five volt device which returns values from 3.1 to 5 volts relative to pressure differential sensed. The pressure transducer has a range of 0 to 1.5 p.s.i. The controller 56 needs accept these values with a minimum range 0 to 512, corresponding to the full voltage range.

The controller 56 processes the values to minimize noise and to eliminate values read during flow. While beer is flowing, the fluid pressure drops as part of the Bernoulli principle. Recognizing this obvious change in pressure is necessary for the controller 56 to both acknowledge that flow is occurring and to not include these data points as indicative of the non-flowing state. Some noise is inherent in the system and is eliminated using an average algorithm within the controller 56. The controller stores what it calculates to the voltage level of the resting liquid height.

Based on an internal algorithm, the controller 56 periodically communicates the value to an off-site server. The data includes the readings of the transducer 48, the time of the reading, and the unique identification number associated with that unit. The method of communication is IP. The IP connection is via WiFi to a local access point. The data is posted to an off-site server rather than being queried. The controller is configurable by the average user so that it can become part of the LAN. The user also configures the unit's unique identifying value. The antenna 52 (shown in FIG. 1) for the controller is on a wire for location outside of the refrigerated space.

The controller 56 is responsible for turning on the solenoid 58 for disconnecting the beer flow when the keg 12 is empty. When the pressure transducer indicates that liquid and gas pressures are equal, this signals that gas has entered the dip tube 17. At this point, flow is stopped so that gas cannot enter the liquid flow path 70.

The controller 56 also includes a temperature measuring mechanism for sensing temperature in the transducer area. The value of the temperature measuring device is relayed by the controller with the other values.

The controller 56 has a form factor such that it can be easily be mounted in the refrigeration unit. It is connected by modular wiring to each coupler 18 that may be used with separate kegs. It is powered by a standard 120 volt, 60 Hz AC power source. It has an antenna 52 which is modular such that its wires can be run outside the refrigeration unit through a hole in its wall and plugged into the unit.

Referring to FIG. 5, there is shown a schematic view of an alternate embodiment of the solenoid mechanism of the present invention. Here, the solenoid mechanism is integrated with the handle (shown in FIG. 1 as reference numeral 24) of the coupler. The solenoid mechanism 140 includes a three-part handle connected to the coupler 142. The three-part handle includes a stationary handle 144 and a moving handle 146 and 150. A spring or guide 152 extends between the stationary handle 144 and the moving handle 146. A solenoid 148, in communication with the controller (not shown), is located below the moving handle 146. A pivoting linkage 150 extends from the solenoid 148 to the coupler 142. When the keg becomes empty, the solenoid 148 releases the linkage 150 such that the moving handle 146 and 150 is free to move towards the stationary handle 144. This causes the core of the coupler 142 to disengage from the keg, allowing the ball valve to move to close the keg, thus preventing gas from entering the fluid flow line.

Figure 4:
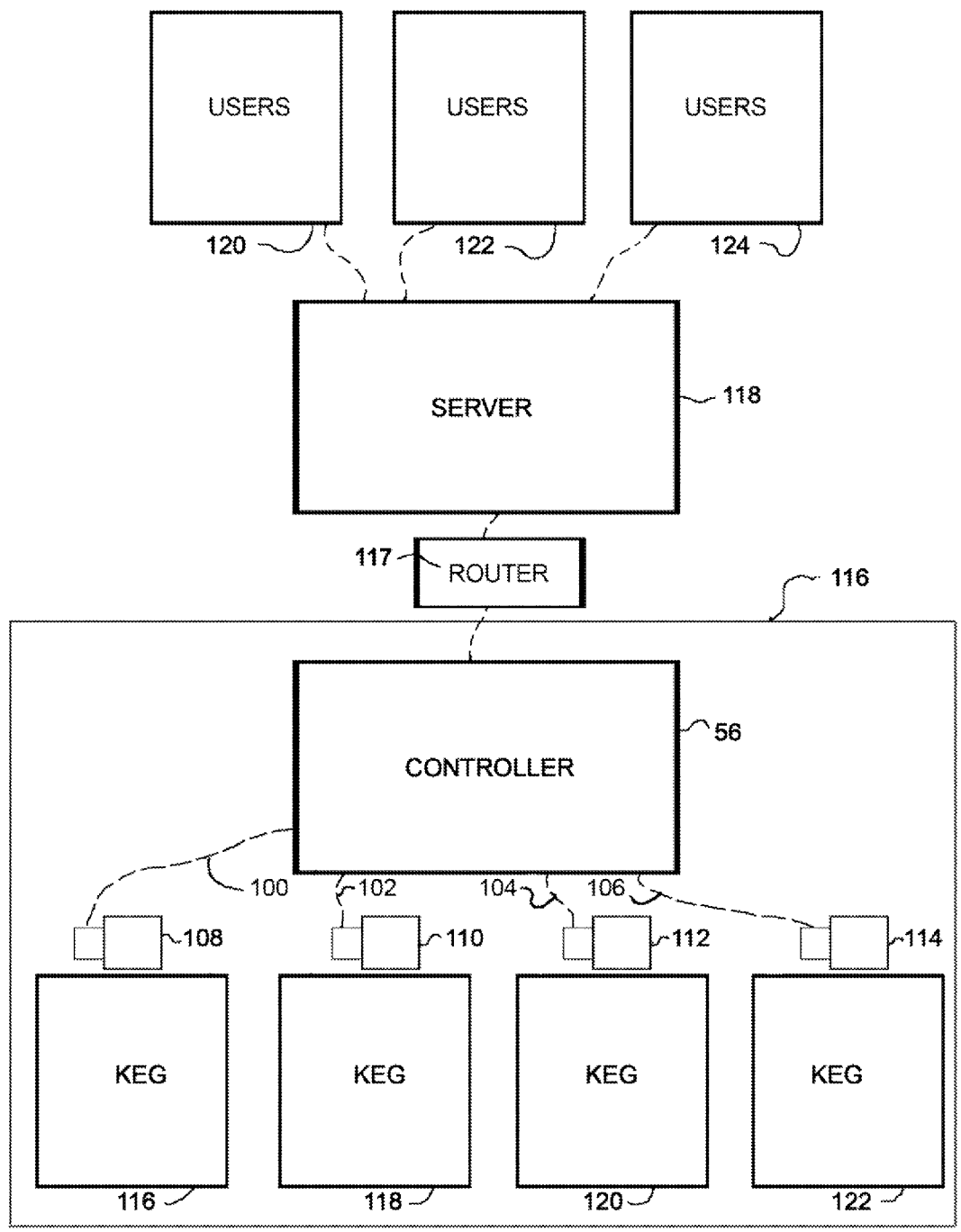
FIG. 4 is a block diagram showing the process and system of the present invention for the measuring of the level of a liquid in a keg.

FIG. 4 is a block diagram showing the process of the present invention. In particular, it can be seen that controller 56 is connected by separate lines 100, 102, 104 and 106 to the separate couplers 108, 110, 112 and 114. The couplers 108, 110, 112 and 114 are attached to separate kegs 116, 118, 120 and 122. Each of the lines 100, 102, 104 and 106 can include various wires that are separately connected to the pressure transducers, to the temperature sensor, the LED and to the solenoid. The controller 56 and the kegs 116, 118, 120 and 122 are maintained within refrigerated space 116. The controller 56 transmits a signal to the server 118 via a router 117. As such, various users 120, 122 and 124 can individually communicate with the server. As such, the condition of the kegs can be properly monitored from a remote location.

The server 118 is located off-site and accepts data via posting from the controller 56 using IP. The server 118 is capable of accepting values from thousands of units with time intervals of five minutes. The server stores the values in a table form. The server processes the data into a graphical user interface accessible via the internet. The user logs onto the server 118 with a username and password so as to allow the user access to the appropriate data. The users can include the retailer, the distributor, and the manufacturer. The server also creates reports for the users.

In particular, for the retailer, information is streamlined for easy view of inventory and usage over time periods of choice. Email and/or texting alerts are customizable and can include a low keg alarm, flow of product during non-business hours and a temperature alarm. Temperature graphing can also be provided. The retailers can compare register receipts with the flow of specific product to various employee shifts.

For the distributor, the inventory can be reported by location and by route. Delivery serves require the report by route. There customizable alarms for critically low inventory. A smart phone application is provided for drivers to record delivery of new product to each location and to correct any errors.

The manufacturer can receive precise times of consumption of their products by type of establishment and geographic location. This data can be used to determine effectiveness of a particular marketing campaign.

The present invention is also configurable for use by the individuals. As such, a phone application can be provided whereby the user can receive information as to the status of his or her keg.

It should be noted that in the system shown in FIG. 4, it is possible that various other types of liquid level measurement can be utilized. For example, weight measurements can be transmitted using the controller and server associated with the present invention. If flow meters are used to determine product flow, such information can also be adapted to the controller 56 for transmission to the server 118 and for reception by the users.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

We claim:

1. A system for measuring a volume of a liquid, the system comprising:
   a keg having a nozzle and a dip tube extending from said nozzle into said keg, said keg having a volume of liquid therein;
   a coupler affixed to said nozzle, said coupler having a gas flow path and a liquid flow path, said gas flow path opening through said nozzle into said keg, said liquid flow path connecting to said dip tube;

a first transducer port cooperative with said gas flow path so as to measure a pressure of gas in said gas flow path;

a second transducer port cooperative with said liquid flow path so as to measure a pressure of liquid at a location above said nozzle of said keg, said liquid flow path being unobstructed along said dip tube to a location above a middle of said coupler and above said first and second transducer ports, said coupler having a ball check valve positioned in said liquid flow path above said first and second transducer ports; and a controller connected to said first and second transducer ports so as to measure a difference between the measured pressure of the gas and the measured pressure of the liquid and to convert the measured difference into a value corresponding to a volume of the liquid in the keg.

2. A system for measuring a volume of a liquid, the system comprising:

a keg having a nozzle and a dip tube extending from said nozzle into said keg, said keg having a volume of liquid therein;

a coupler affixed to said nozzle, said coupler having a gas flow path and a liquid flow path, said gas flow path opening through said nozzle into said keg, said liquid flow path connecting to said dip tube;

a first transducer port cooperative with said gas flow path so as to measure a pressure of gas in said gas flow path;

a second transducer port cooperative with said liquid flow path so as to measure a pressure of liquid at a location above said nozzle of said keg;

a controller connected to said first and second transducer ports so as to measure a difference between the measured pressure of the gas and the measured pressure of the liquid and to convert the measured difference into a value corresponding to a volume of the liquid in the keg, said coupler having a solenoid valve therein or attached thereto, said controller connected to said solenoid valve so as to actuate said solenoid valve when the measured difference indicates that the keg is empty of the liquid so as to close said liquid flow path and to block the flow of gas into said liquid flow path.

3. The system of claim 2, further comprising:

a transmitter connected to said controller so as to transmit said value corresponding to the liquid in said keg to a remote location.

4. The system of claim 3, further comprising:

a server at said remote location, said controller posting said value by said transmitter to said server.

5. The system of claim 4, said controller periodically measuring the difference between the measured pressure of the gas and the measured pressure of the liquid and temporarily storing the periodic measurements, said controller periodically communicating the values to said server.

6. The system of claim 2, said coupler having an indicator thereon, said controller connected to said indicator, said indicator indicating when the volume of the liquid is low.

7. A coupler attachable to a nozzle of a keg, the coupler comprising:

a body having a gas flow path therein and a liquid flow path therein, said body having a connector suitable for coupling to the nozzle of the keg;

a gas inlet port formed on said body, said gas inlet port communicating with said gas flow path so as to allow the gas to be passed into the keg;

a liquid outlet port formed on said body, said liquid outlet port communicating with said liquid flow path; and a first transducer port affixed to said body and cooperative with said gas flow path so as to measure a pressure of gas therein;

a second transducer port affixed to said body and cooperative with said liquid flow path so as to measure a pressure of the liquid therein; and a ball check valve affixed within said body in said liquid flow path adjacent to said liquid outlet port in a position above said first and second transducer ports.

8. The coupler of claim 7, further comprising:

a handle extending outwardly of said body, said handle being movable between a position in which said connector of said body is uncoupled from the nozzle of the keg and in a position in which said connector of said body is locked onto the nozzle of the keg.

9. The coupler of claim 7, further comprising:

a solenoid valve cooperative with said liquid flow path so as to be actuatable so as to block said liquid flow path when the keg is empty.

10. The coupler of claim 7, further comprising:

a controller connected to said first and second transducer ports so as to measure a difference between the measured pressure of the gas and the measured pressure of the liquid and to convert the measured difference into a value corresponding to a volume of the liquid in the keg.

* * * * *